United States Patent [19]
Guzzella

[11] Patent Number: 5,584,619
[45] Date of Patent: Dec. 17, 1996

[54] METHOD OF AND ARRANGEMENT FOR PREVENTING ACCIDENTS DURING OPERATION OF A MANUALLY-OPERATED MACHINE TOOL WITH A ROTATABLE TOOLBIT

[75] Inventor: Lino Guzzella, Wallisellen, Switzerland

[73] Assignee: Hilti Aktiengesellschaft, Schaan, Liechtenstein

[21] Appl. No.: 364,154

[22] Filed: Dec. 27, 1994

[30] Foreign Application Priority Data

Dec. 28, 1993 [DE] Germany .......................... 43 44 817.8

[51] Int. Cl.$^6$ ................................................. B23B 47/24
[52] U.S. Cl. ............................................ 408/9; 408/1 R:6
[58] Field of Search ........................ 408/1 R, 8, 9, 408/14; 175/45, 46, 48; 364/474.12, 474.19, 474.28

[56] References Cited

U.S. PATENT DOCUMENTS

| | | |
|---|---|---|
| 3,969,661 | 7/1976 | Morinaga et al. .................. 318/375 |
| 4,559,600 | 12/1985 | Rao .................................... 408/8 X |
| 4,604,006 | 8/1986 | Shoji et al. ........................ 408/9 X |
| 4,650,375 | 3/1987 | Millsap ............................. 408/9 X |
| 4,813,821 | 3/1989 | Hirota ............................... 408/8 X |
| 4,831,364 | 5/1989 | Shinohara et al. ................. 408/9 X |
| 4,985,841 | 6/1991 | Iwagaya ............................ 408/9 X |
| 5,237,540 | 8/1993 | Malone .............................. 175/45 X |
| 5,265,682 | 11/1993 | Russell et al. ..................... 175/45 |

*Primary Examiner*—M. Rachuba
*Assistant Examiner*—Henry W. H. Tsai
*Attorney, Agent, or Firm*—Anderson, Kill & Olick P.C.

[57] ABSTRACT

A method of and an arrangement for preventing accidents during operation of a manually-operated machine tool having a rotatable toolbit and a drive motor for driving the toolbit, wherein an operational condition of the toolbit is determined with a rotational motion sensor, a time constant is selected, a maximum forecast rotational angle at an end of a time period determined by the selected time constant is calculated on a basis of a rotational motion signal generated by the sensor, and transmission of drive motion from the drive motor to the rotatable toolbit is interrupted as soon as the calculated, forecasted rotational angle exceeds a value of the maximum allowable rotational angle.

20 Claims, 4 Drawing Sheets

5,584,619

METHOD OF AND ARRANGEMENT FOR PREVENTING ACCIDENTS DURING OPERATION OF A MANUALLY-OPERATED MACHINE TOOL WITH A ROTATABLE TOOLBIT

FIELD OF INVENTION

The invention relates to a method of and an apparatus for preventing accidents during operation of manually-operated machine tools with a rotatable toolbit, in particular, hammer drills, by interrupting the transmission of motion from a drive motor of the machine tool to the toolbit, dependent on the operational condition of the toolbit which is sensed by a rotational motion sensor.

During an operation of manually-operated machine tools, particularly such powerful machine tools as drill hammers, the accidents which may be caused by the rotating toolbit, such as an injury of a hand or damage to a ladder, a scaffold and the like, are prevented by rapid blocking of the toolbit. However, rapid increase of the reaction torque of the machine tool presents a serious problem. Of a plurality of prior art publications directed to the solution of this problem, two publications can be named as examples, EP-A-0150 669 and WO-DE 88-00109.

The first publication, EP-A-0150 669, discloses providing, in the machine tool housing, of a closed small container containing an electrically conductive liquid mass, specifically mercury, which is interspersed by a magnetic field of a permanent magnet.

Upon a more or less jerky rotation of the housing about the spindle axis, as a result of an action of the reaction torque, a relative movement takes place between the conductive liquid and the container or the permanent magnet which is fixed in the container and which induces voltage in the conductive mass. This voltage which appears, for example, when a predetermined threshold value is exceeded, is sensed and is used for releasing a coupling which connects the drive motor with the toolbit, and the release of which interrupts the transmission of the drive motion from the electric motor to the toolbit.

The second publication, WO-DE-88 0-0109, discloses a device operable on a similar principle, namely, the use of rotational motion sensors which are fixed in or on the housing and which sense a magnitude of a rotational path, and/or an angular speed, and/or an angular acceleration of a pivotal movement of the manually-operated machine tool.

Dependent on a predetermined criterium, the sensor signal actuates a respective coupling or clutch which interrupts the transmission of the drive motion from the electric motor to the toolbit. As a rotational motion sensor, according to this publication, a spring-loaded mechanical inertial switch is used which acts directly on the clutch.

The drawbacks of the solutions, which are disclosed in the above-discussed two publications, consist in that during the operation of the machine tool, for example, in this case a drill hammer, in a cement mass, the unhomogeneous composition may trigger a false actuation of the safety coupling. These, as well as all of the other known solutions, are based on a passive evaluation of the accident signal, in particular, when the motion sensor and the actuator are part of a single unit and when a pure mechanical or electromechanical principle is used for preventing accidents.

Accordingly, an object of the invention is providing in a manually-operated machine tool with a rotatable toolbit means for preventing accidents, which is based on a better difference criterium between allowable and dangerous reaction moments that could result in an accident.

Another object of the invention is providing means which would enable an early actuation of safety or interrupting means, so that the safety of the operation with the machine tool with a rotatable toolbit is substantially increased.

SUMMARY OF THE INVENTION

These and other objects of the invention, which will become apparent hereinafter, are achieved by providing a method of preventing accidents during operation of a manually-operated machine tool having a rotatable toolbit and a drive motor for driving the toolbit, which includes the step of determining an operational condition of the tool with a rotational motion sensor, selecting a time constant, calculating, on a basis of a rotational motion signal generated by the sensor, a maximum forecast rotational angle at an end of a time period determined by the selected time constant, and interrupting transmission of drive motion from the drive motor to the rotatable toolbit as soon as the calculated, forecasted rotational angle exceeds a value of the maximum allowable rotational angle.

Thus, the invention is based on an idea of an advanced forecast of a future behavior of the machine tool so that appropriate counter measures can be undertaken before the machine tool attains a too large rotational pulse, when an accident can no longer be prevented.

According to the invention, as a rotational motion sensor, an angular acceleration sensor such as a micromechanical acceleration meter with a very short response time, is used. When the sensor-generated measurement signal exceeds a predetermined reference value, it is converted by double integration over a time period, determined by a time constant, into a forecast or expected rotational angle. The double integration is advantageously effected with limiting the used band width.

To reduce the influence of low and/or high frequency disturbances which are always present, the used band width has a lower limiting frequency of $0.5$–$10$ $H_z$ and an upper limiting frequency of $100$–$1000$ $H_z$.

As interrupting means according to the invention, an electromagnetic friction coupling is used. However, a multiple-disc coupling as well as a claw coupling can be used for interrupting the transmission of the drive motion from the electric motor to the rotating toolbit. By diverse measures, by research and by practical experience, it was determined that for a desired interruption, dependent on the type of machine tool used, the decoupling time lies within the range of 5–20 milliseconds. The decoupling can, and as a rule, is connected with a simultaneouls cut-off of a current flow to the electrical motor.

For small machine tools with relatively light rotors, instead of a coupling, a quick-action brake can be used, again, in connection with simultaneous current cut-off. The safety means is generally actuated when a forecast rotational angle calculated on a basis of a rotational motion signal sensed by the sensor, exceeds a predetermined maximum allowable rotational angle, for example, 40°–75°, from a momentary actual angle of the toolbit.

An arrangement for preventing accidents during operation of a manually-operated machine tool having a rotatable toolbit and a drive motor for driving the toolbit, includes means for interrupting transmission of the drive motion from the drive motor to the toolbit, a rotational motion sensor for determining an operational condition of the toolbit, computer means for calculating, on a basis of a rotational motion signal generated by the sensor, a maximum forecast rotational angle at an end of a time period determined by a selected time constant, and an output interface for transmitting to the interrupting means an actuation signal generated by the computer means when the calculated, forecasted rotational angle exceeds a pre-determined maximum allowable rotational angle.

The calculation means, e.g., computer means, preferably includes band width limiting filter means with above-indicated limiting frequencies. As a rotational motion sensor or sensors, angular acceleration sensors, in particular a micromechanical acceleration meter, angular speed sensors, or torque sensors, can be used. According to the present knowledge, angular acceleration meters or sensors with a response time usually of less than one millisecond, is preferred.

BRIEF DESCRIPTION OF THE DRAWINGS

The objects and features of the present invention will become more apparent and the invention itself will be best understood, from the following detailed description of the preferred embodiment when read with reference to the accompanying drawings, wherein.

DETAILED DESCRIPTION OF THE PREFERRED EMBODIMENT

An arrangement for an advanced prevention of accidents by an immediate blocking of a rotating toolbit of a manually-operated machine tool, in particular of a hammer drill, and an algorithm and an evaluation circuit therefor, according to the present invention, will now be described in detail with reference to the drawings.

Figure 1:
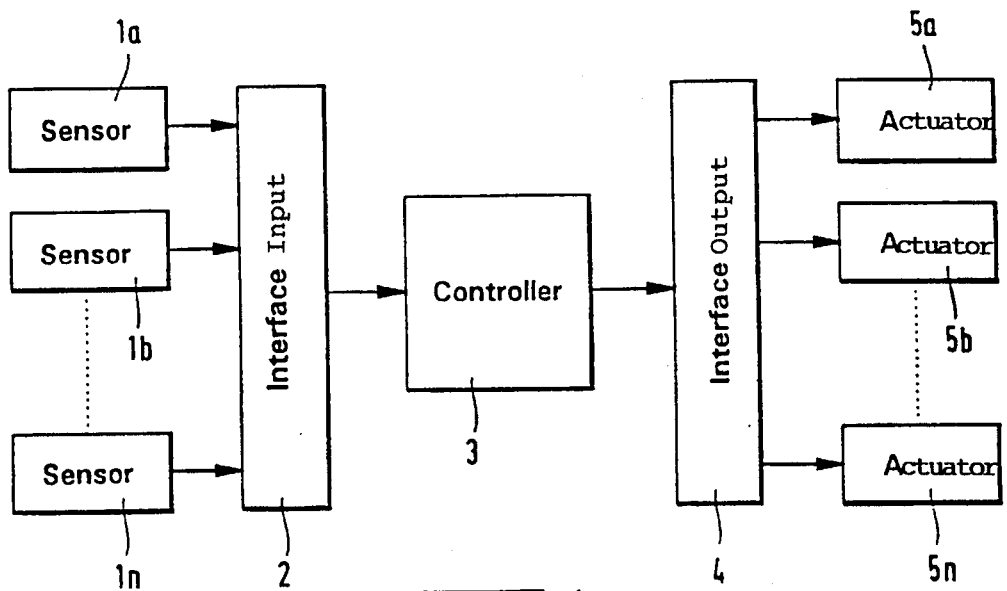
FIG. 1 is a block diagram of a basic arrangement according to the present invention for forecasting a need for an action to prevent an accident that may be caused by a rotating toolbit.

As shown in FIG. 1, an operational condition of a manually-operated machine tool M can be monitored with at least one sensor, such as an angular acceleration sensor 1a, which can be formed by an accelerator meter, angular speed sensor 1b, a path meter (translational sensor) ets., or a torque sensor 1n.

The sensor signals are transmitted through an input interface 2, which can be formed as analog-to-digital convertor, ets., to an electronic evaluation unit which may be formed as a microcontroller based on a discreet circuit technique, a signal processor or the like, and which includes a pattern-or control-based alogorithm that predicts an operational condition of the machine in response to signals received from a sensor or sensors 1a–1n. A tested example of such a pattern-based alogorithm will be discussed in more detail below.

When a potential accident is detected, the evaluation unit or controller 3 transmits command signals through an output interface 4 to one or more actuators 5a–5n, for example, to a coupling 5a which interrupts the drive path between the drive motor 7 and the tool holder or tool 8, to a circuit breaker 5b and/or brake 5n.

These actuators prevent a predicted or precalculated damage event from occurring, in particular a damage event which may be caused by the rotating toolbit. As soon as the machine tool is transferred into a condition which is safe for the machine tool operator, it can again be actuated by the operator.

Figure 2:
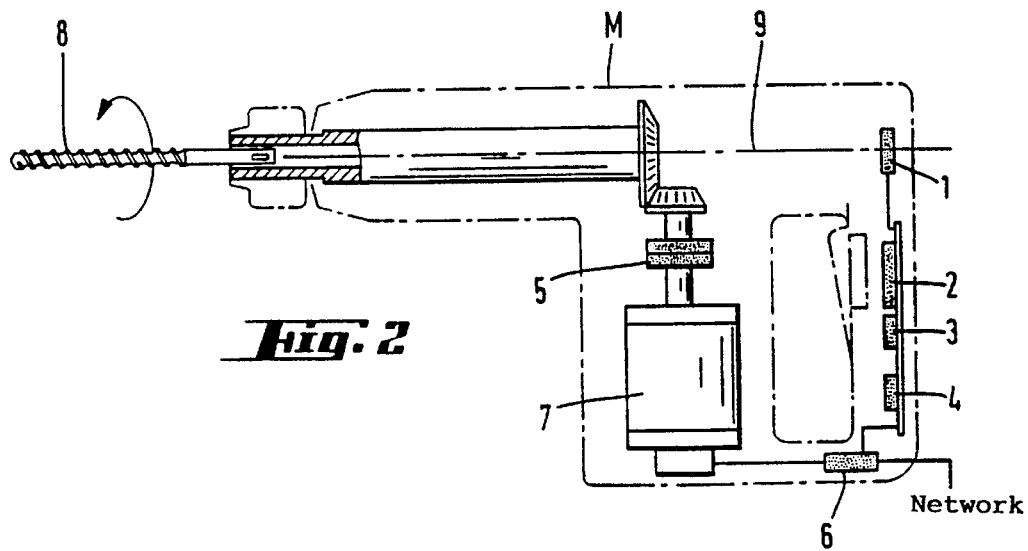
FIG. 2 is a schematic view of a hammer drill, taken as an example of a manually-operated machine tool, in which the essential elements of the arrangement of FIG. 1 are shown with marked rectangles.

In the example of an arrangement shown in FIG. 2, a combination of an inertial angular acceleration sensor 1 with an integrated amplifier, a programmed microcontroller 3 with an analog-to-digital converter, a digital interface 2, a digital-to-analog interface 4, a semiconductor circuit breaker 6, and an electromagnetic coupling 5 is used.

A jerky reaction about the axis 9, which occurs in operation by a sudden blocking of the toolbit according to the invention, should be limited in accordance with calculations, to a non-dangerous rotational angle of typically less than 60°. The angular acceleration about the axis 9 is detectable by the angular acceleration sensor 1 whose autodynamics, in view of the problem solved, should be sufficiently rapid with a response time typically less than one millisecond.

The use of such angular acceleration sensors are known for example, in micromechanical devices, and the sensors are usually available on the market. They are usually available in a form of a differential condensator, in which the middle electrode of the condensator is formed as a pendulum mass of a B-meter that can be directly built into the measuring circuit. An amplified signal of the sensor 1 is transmitted, through the analog-to-digital interface 2, to the microcontroller 3 and is processed there according to the evaluation algorithm, which will be discussed in detail further below.

Figure 3:
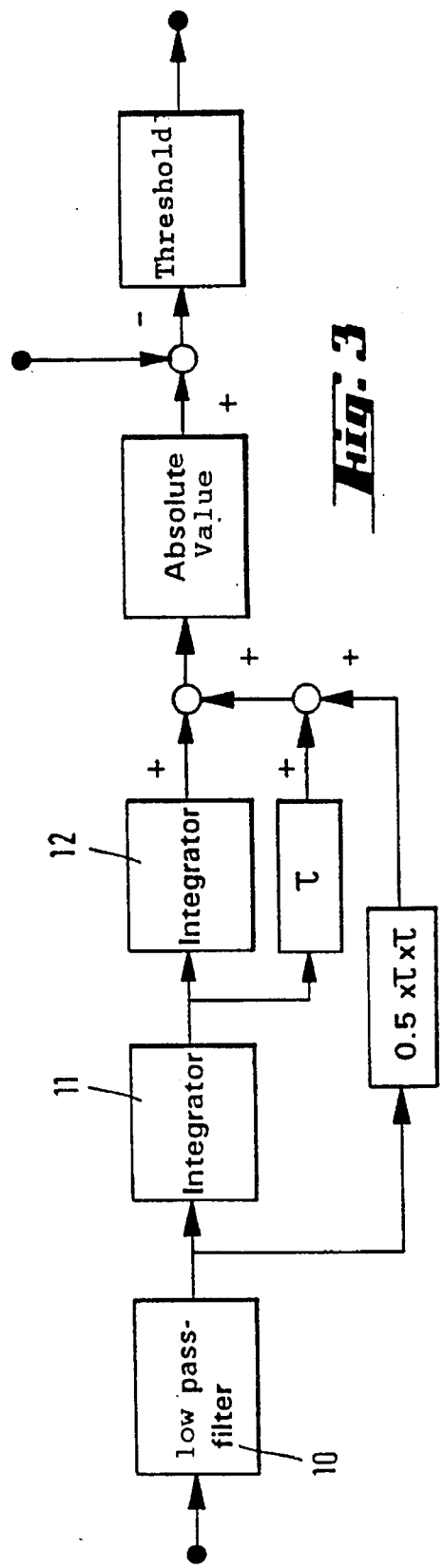
FIG. 3 is an operational block diagram for effecting an advanced signal evaluation with the use of acceleration meters as sensors.

The evaluation algorithm is basically shown in FIG. 3 and serves to predict the behavior of the machine M in response to a signal from the sensor. The input filter 10, formed as a low-pass filter, serves for reducing of high-frequency disturbances. After a double integration with integrators 11 and 12, initialized at suitable points of time, based on the sensor signal, a constant acceleration of an expected rotational angle by actual time t, plus a pre-set or pre-settable time period $\tau$ is calculated.

This so-called predictable or Look-Ahead time constant $\tau$ should be so selected that, on one hand, sufficient time remains for taking necessary safety measures and, on the other hand, a reliable forecast is made. As soon as the forecasted rotational angle exceeds a predetermined allowable maximum rotational angle, a respective actuator, which is provided with an amplifier, is actuated by microcontroller 3 through the output interface 4, which is provided with a digital-to-analog converter.

The actuator actuates the circuit breaker 6, formed as a high-speed semi-conductor circuit breaker 6, which interrupts the flow of current to the drive motor 7 of the machine M, and on the other hand, turns off the coupling 5, which breaks the drive path between the rotor of the drive motor 7 and the remaining elements of the drive path from the drive motor rotor to the toolbit 8.

Thereby, it is achieved that no additional electrical energy is supplied to the machine tool, on one hand, and on the other hand, it is insured that a kinetic energy, which is already accumulated in the rotor of the drive motor 7, is not used for an undesirable rotation of the toolbit 8.

In the case when angular speed sensors are used, the mathematical basis of the inventive idea, Look-Ahead idea, consists in double integration in the interval t (actual time)—(t+τ). Based on constant simulated acceleration u(t), with the use of actual values of a rotational angle ψ(t) and the angular speed ω(t) as initial parameters. The following equation serves for calculating u(t):

$$\frac{d\omega(t)}{dt} = \frac{d^2\phi(t)}{dt^2} = u(t)$$

The acceleration u(t) is measured with angular speed sensor 1 and is compared, for example, with a constant preset acceleration value u(φ). Under these conditions, within the time interval t–(t+τ), the assumption u(t)=u(φ) is valid.

Therefrom follows:

$$\rightarrow \frac{d\zeta(t+\tau)}{dt} = u_\phi \tau + w(t)$$

$$\rightarrow \zeta(t+\tau) = \frac{1}{2} u_\phi \tau_2 + \omega(t)\tau + \phi(t).$$

The more the precalculated estimation ζ(t+τ) approaches the true rotational angle ψ(t+τ), the better the obtained equation comes true for the accelaration u(t). In this regard, it is very important to reduce the influence of low and/or high frequency disturbances which are always present.

In a practically tested embodiment of the invention, in the block diagram of FIG. 3, the integrators 11 and 12 are formed as band-limiting integrators, i.e., at low frequencies the amplification of these elements is limited to a finite value. This is important, because slow hand movements of an operator which are always present during normal operation and which should not result in an emergency turn-off of the machine, should not be transmitted to the integrators 11 and 12.

In addition, the band-limiting integrators 11 and 12 eliminate the switching-off drift, in a case when the acceleration sensor 1 is characterized by a quasi-statical behavior in which a pieso-electrical acceleration sensor is used as sensor 1.

The mathematical description of a band-limiting integrator is usually made by using its transfer function:

$$G_I(s) = \frac{T_I}{T_I s + 1},$$

where the parameter $T_I$ is obtained from the equation $$T_I = \frac{1}{\omega_u},$$

where $\omega_u$ indicates the frequency which the integrated parameter should attain.

Usually, when a manually-operated drill is used, very large acceleration values are obtained with likewise very high frequencies. In order that these very high values do not lead to an erroneous actuation of the safety arrangement (circuit breaking, coupling release), it is necessary to filter out the signals exceeding an upper cut-off frequency $\omega_o$. This band width limitation of the input signal from the sensor 1 is effected with the low-pass filter 10 shown in FIG. 3.

Figure 4:
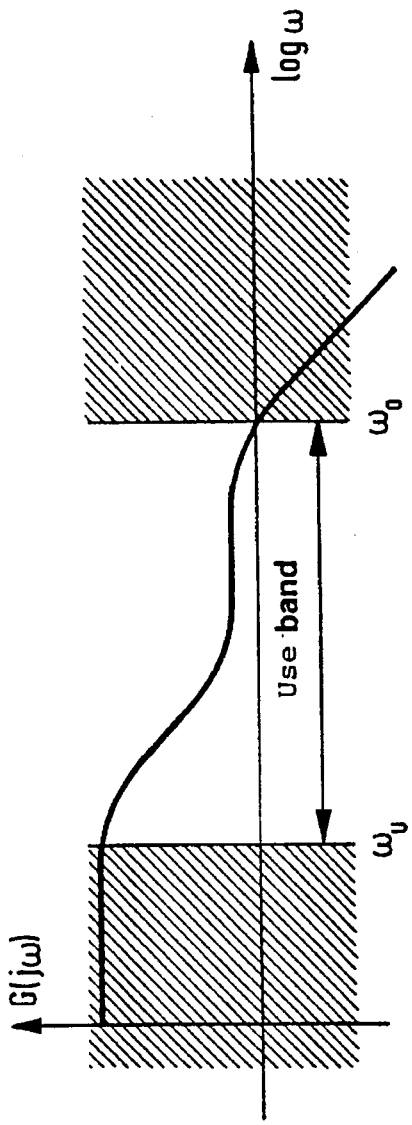
FIG. 4 is a diagram of a transfer function when band limiting integrators are used in the arrangement of FIG. 3.

The scaled complex transfer function, which is determined by a logarithm of the rotary frequency ω within a band range used, according to the present invention, is schematically shown in FIG. 4. The band is defined by limits $\omega_u$ and $\omega_o$, which are different according to the invention.

For a manually-operated drill, as an example, the following values are used:

0.5 $H_{z<\omega u}$<10 $H_z$

100 $H_z<\omega_o$<1000 $H_z$

The corresponding values for other types of manually-operated machine tools are easily determined by operators in an obvious manner experimentally.

Figure 5:
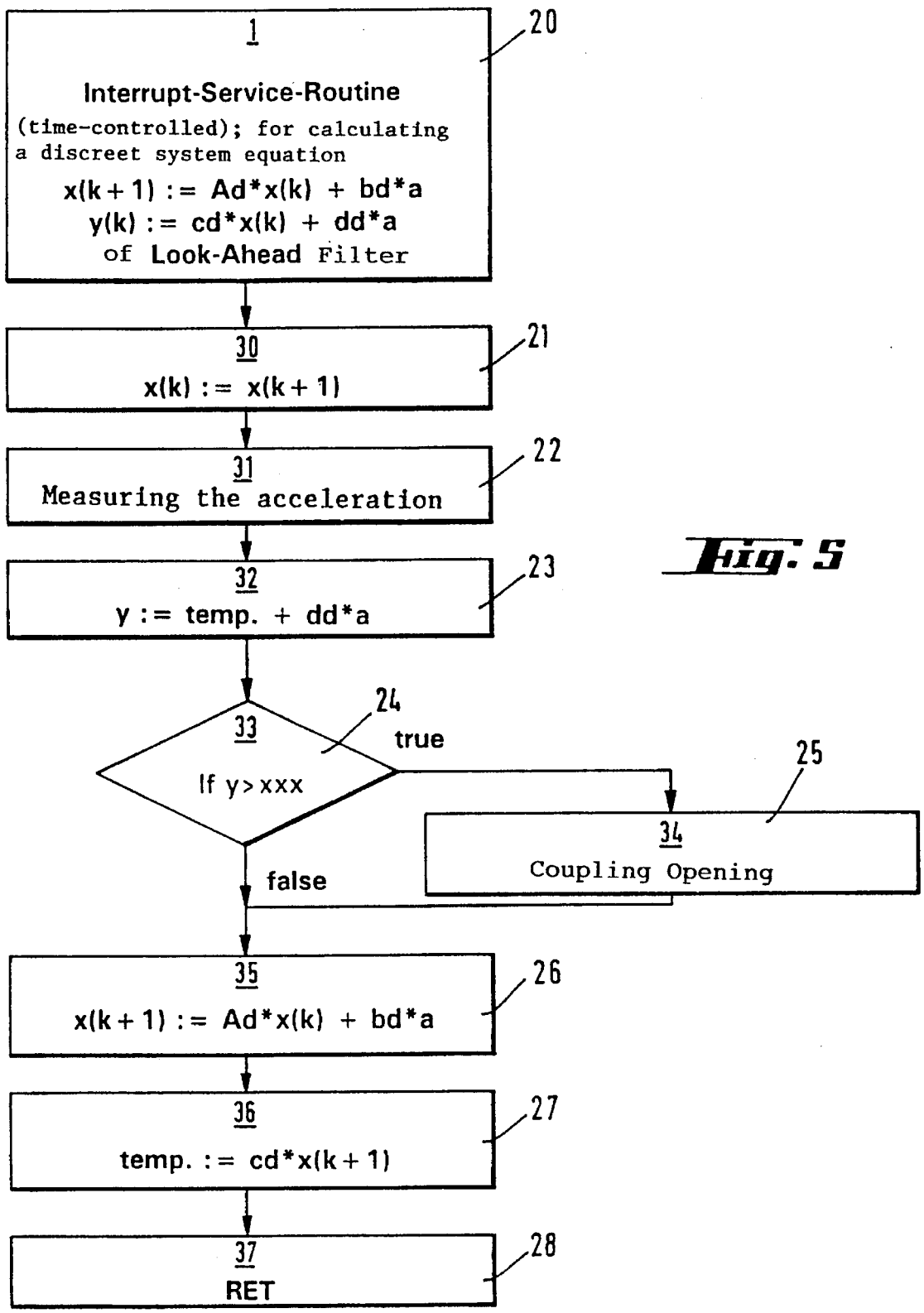
FIG. 5 is a source code flow chart for signal evaluation with a microprocessor.
Figure 6:
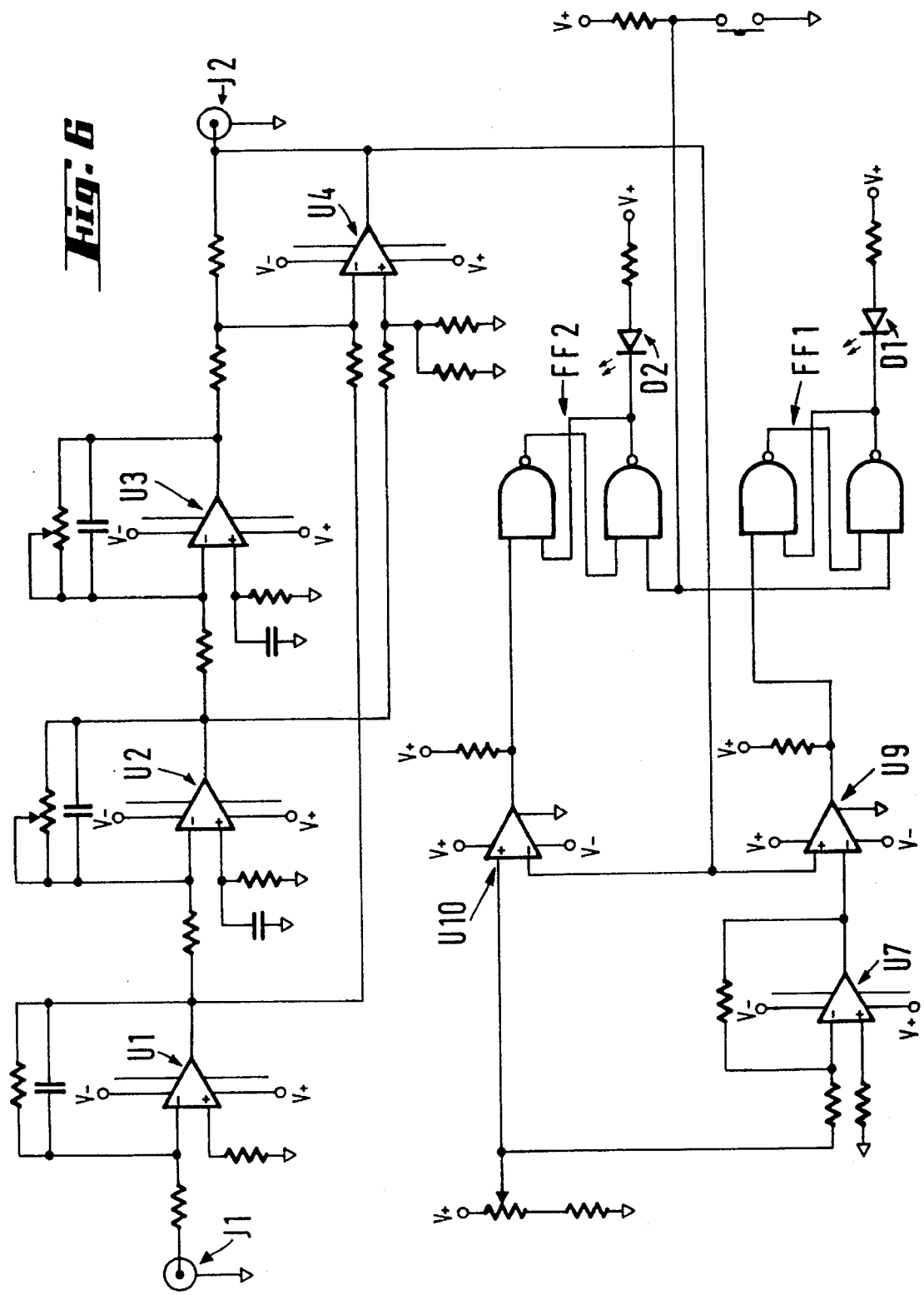
FIG. 6 is an analog circuit diagram for effecting executive routine, according to the present invention.

The execution of the signal evaluation according to the diagram of FIG. 3 can be effected with a microprocessor equipped with appropriate software (see FIG. 5) or by using an analog electronic circuit (see FIG. 6).

FIG. 5 shows a flow chart of a time-controlled interrupt-service routine for calculation of a discreet system equation, which is given in block 20 (Field 1) of the inventive, Look-Ahead, circuit including the necessary filter, e.g., a low-pass filter. This flow chart is executed periodically, within a fixed interval. The discreetization must ensue for a selected interval.

In Block 21 (Field 30), the variables are stored.

In Block 22 (Field 31), the analog-to-digital converter of the analog-to-digital interface 2 for processing an acceleration signal, is actuated. As soon as the analog-to-digital converter is closed, the signal is read-in into the computer (controller 3).

In Block 23 (Field 32), a part which directly depends on the input signal, is added to the value calculated in the preceding step. This calculated value y is monitored in Block 24 (decision field 33) for determining whether it exceeds a positive and/or negative threshold and, if necessary, the actuator, in particular coupling 5, is open (Block 25, Field 34).

In Blocks 26 and 27 (Fields 35 and 36), variables for the next step in accordance with the given condition and the already calculated part "temp" of the signal y, are calculated.

In Block 28 (End Field 37), a feedback is processed in a background program in which different other functions are carried out, until a next interruption for effecting a further calculation cycle is initiated.

The electronic circuit diagram of FIG. 6 for effecting the executive routine according to the block diagram of FIG. 3, will now be briefly described.

A voltage signal, corresponding to the actual acceleration, is supplied to the input J1 and then, via a low-pass filter U1, to the first band-limiting integrator U2 (integrator 11 in FIG. 3), and thereafter to the second band-limiting integrator U3 (integrator 12 in FIG. 3). The predetermined time constant in a predetermined manner is evaluated in an adjustable RC-module.

The output signals of the low pass filter U1, the integrators U2 and U3 are summarized in a summing amplifier U4 by means of series resistors to provide an evaluation signal. The output signal of the summing amplifier U4 is supplied, on one hand, to an output J2 and, on the other hand, to comparators and U10, which monitor whether a positive maximum or a negative maximum is exceeded, where the negative maximum can be preset with an inverse amplifier U7.

The output signals of the comparators U9 and U10 set two flip-flops FF1 and FF2, each of which is formed of two NAND-elements. The output signals of the flip-flops FF1 and FF2 are shown by light-emitting diodes LED D1 and LED D2. In addition, the output signals of the flip-flops FF1 and FF2 are used for switching of the coupling 5.

The solution, according to the present invention, in comparison with known solutions for preventing accidents caused by a rotating tool of a manually-operated machine tool, has an advantage consisting in that by means of an evaluation algorithm implemented advantageously in a microprocessor, or by means of a forecast evaluation, a future behavior of the machine tool can be predicted, and safety measures can be undertaken before the machine would be provided with a too large rotational pulse when an accident cannot be prevented any longer.

Thanks to a high-speed evaluation logic, the operator's intent can be correctly interpreted and a desired operational condition can be quickly reinstated after a detection of a potential accident and the execution of necessary preventive measures. A particular advantage consists in that a continuous or periodic self-test can be easily executed by using an appropriate program, as well as in a precise actuation and an aging-independent release behavior.

For implementing the invention, the following elements are necessary:

- An acceleration sensor (piezo-electrical, piezo-resistive, inertial, connected into and/or integrated as a part of a microelectronic circuit);
- An evaluation unit, either an analog unit formed by operational amplifiers, diodes, ets., (see FIG. 6) or a digital unit formed by a microprocessor based on an execution of corresponding process steps (FIGS. 1 and 5); and
- One or several actuators for breaking the connection between the drive motor and the toolbit (e.g., an electro-magnetic friction coupling), preferably connected with a circuit breaker.

Though the present invention was shown and described with reference to preferred embodiments, various modifications thereof will be apparent to those skilled in the art and, therefore, it is not intended that the invention be limited to the disclosed embodiments and/or details thereof, and departures can be made therefrom within the spirit and scope of the appended claims.

What is claimed is:

1. A method of preventing accidents during operation of a manually-operated machine tool having a rotatable toolbit and a drive motor for driving the toolbit, said method comprising steps of:
   determining an operational condition of the toolbit with a rotational motion sensor;
   selecting a time constant;
   calculating, on a basis of a rotational motion signal generated by the sensor, a maximum forecast rotational angle at an end of a time period determined by the selected time constant; and
   interrupting transmission of drive motion from the drive motor to the rotatable toolbit as soon as the calculated, forecasted rotational angle exceeds a value of maximum allowable rotational angle.

2. A method according to claim 1, comprising a step of selecting an angular acceleration sensor as the rotational motion sensor, and wherein said calculating step includes converting a measurement value sensed by the angular acceleration sensor, when the measurement value exceeds a predetermined reference value, into a forecast rotational angle by double integration.

3. A method according to claim 2, comprising a step of limiting a band width of the rotational motion signal generated by the angular acceleration sensor before an integration process.

4. A method according to claim 2, comprising a step of limiting a band width of the rotational motion signal generated by the angular acceleration sensor during an integration process.

5. A method according to claim 3, wherein said limiting step includes selecting an upper limiting frequency of the band width in a range of 100–1000 $H_z$.

6. A method according to claim 4, wherein said limiting step includes selecting an upper limiting frequency of the band width in a range of 100–1000 $H_z$.

7. A method according to claim 3, wherein said limiting step includes selecting a lower limiting frequency of the band width in a range of 0.5–10 $H_z$.

8. A method according to claim 4, wherein said limiting step includes selecting a lower limiting frequency of the band width in a range of 0.5–10 $H_z$.

9. A method according to claim 5, wherein said limiting step includes selecting a lower limiting frequency of the band width in a range of 0.5–10 $H_z$.

10. A method according to claim 6, wherein said limiting step includes selecting a lower limiting frequency of the band width in a range of 0.5–10 $H_z$.

11. A method according to claim 1, comprising a step of providing the machine tool with a coupling for connecting the drive motor with the toolbit, and wherein said interrupting step includes release of the coupling.

12. A method according to claim 1, comprising the step of providing the machine tool with an electromagnetic brake, and wherein said interrupting step includes actuating the electromagnetic brake.

13. A method according to claim 1, comprising a step of providing the machine tool with a circuit breaker for cutting off a current flow to the drive motor, and wherein said interrupting step includes actuating the circuit breaker.

14. An arrangement for preventing accidents during operation of a manually-operated machine tool having a rotatable toolbit and a drive motor for driving the toolbit, said arrangement comprising:
   means for interrupting transmission of drive motion from the drive motor to the toolbit;
   a rotational motion sensor for determining an operational condition of the toolbit;
   computer means for calculating, on a basis of a rotational motion signal generated by the sensor, a maximum forecast rotational angle at an end of a time period determined by a selected time constant; and
   an output interface for transmitting to the interrupting means an actuation signal generated by the computer means when the calculated, forecasted rotational angle exceeds a pre-determined maximum allowable rotational angle.

15. An arrangement according to claim 14, wherein the rotational motion sensor comprises an angular acceleration meter.

16. An arrangement according to claim 14, wherein said interrupting means comprises a coupling.

17. An arrangement according to claim 15, wherein the angular acceleration meter comprises one of piezo-electrical, piezo-resistive, micromechanical angular acceleration sensor.

18. An arrangement according to claim 15, wherein said angular acceleration meter comprises a composite chip a pendulum of which forms a middle electrode of a differential condensator.

19. An arrangement according to claim 14, wherein the computer means comprises two seriesly connected integrators with a limited band width.

20. An arrangement according to claim 19, further comprising a low-pass filter provided upstream of the first integrator, and wherein the used band width has a lower limiting frequency in a range of 0.5–10 $H_z$, and an upper limiting frequency in a range of 100–1000 $H_z$.

* * * * *